United States Patent [19]
Volkart et al.

[11] Patent Number: 5,893,897
[45] Date of Patent: Apr. 13, 1999

[54] METHOD OF DETECTING COMBUSTION MISFIRES BY EVALUATING RPM FLUCTUATIONS

[75] Inventors: Asmus Volkart, Bietigheim-Bissingen; Klaus Ries-Müller, Bad Rappenau; Jürgen Förster, Chemnitz, all of Germany

[73] Assignee: Robert Bosch GmbH, Stuttgart, Germany, DEX

[21] Appl. No.: 08/936,538

[22] Filed: Sep. 24, 1997

[30] Foreign Application Priority Data

Oct. 11, 1996 [DE] Germany .................. 196 41 916

[51] Int. Cl.$^6$ .................. G01M 15/00; F02D 1/00; F02P 1/00
[52] U.S. Cl. .................. 701/110; 73/116; 73/117.3; 123/419; 123/436
[58] Field of Search .................. 73/116, 117.2, 73/117.3; 123/419, 425, 436; 701/110, 111

[56] References Cited

U.S. PATENT DOCUMENTS

| | | | |
|---|---|---|---|
| 5,044,194 | 9/1991 | James et al. | 73/117.3 |
| 5,237,504 | 8/1993 | Holmes et al. | 123/419 |
| 5,379,634 | 1/1995 | Kuroda et al. | |
| 5,387,253 | 2/1995 | Remboski, Jr. et al. | |
| 5,400,644 | 3/1995 | Remboski, Jr. et al. | |
| 5,483,927 | 1/1996 | Letang et al. | |
| 5,495,415 | 2/1996 | Ribbens et al. | 73/117.2 |
| 5,559,285 | 9/1996 | Bryant et al. | 73/117.3 |
| 5,576,963 | 11/1996 | Ribbens et al. | 73/117.3 |
| 5,691,469 | 11/1997 | Mezger et al. | 73/117.3 |
| 5,699,253 | 12/1997 | Puskorius et al. | 73/117.3 |

FOREIGN PATENT DOCUMENTS

4138765 7/1992 Germany.

Primary Examiner—George M. Dombroske
Attorney, Agent, or Firm—Walter Ottesen

[57] ABSTRACT

The invention is directed to a method for detecting combustion misfires in an internal combustion engine having a crankshaft and a transducer wheel coupled to the crankshaft and a sensor. The combustion misfires are detected on the basis of a time-dependent trace of the rotational movement of the transducer wheel and the transducer wheel has predetermined segments which pass the sensor. In the method, a sensor is utilized to detect segment times in which the segments pass the sensor so that the sensor produces a sensor signal representing the segment times. The sensor signal is applied as an input signal to first and second lowpass filters mutually connected in parallel thereby obtaining first and second output signals which react with different speeds to changes in the input signal. The difference between the first and second output signals is formed and a measure is, in turn, formed for the changes of the difference. The measure is compared to a threshold value and a movement of the measure above the threshold value is evaluated as a misfire.

10 Claims, 2 Drawing Sheets

METHOD OF DETECTING COMBUSTION MISFIRES BY EVALUATING RPM FLUCTUATIONS

FIELD OF THE INVENTION

The invention relates to a method for detecting combustion misfires for internal combustion engines.

BACKGROUND OF THE INVENTION

Combustion misfires lead to an increase of the toxic substances emitted during operation of the internal combustion engine and can, furthermore, lead to damage of a catalytic converter in the exhaust-gas system of the engine. It is necessary to detect combustion misfires in the entire rpm and load ranges in order to satisfy statutory requirements for on-board monitoring of exhaust-gas relevant functions. In this context, it is known that, for operation with combustion misfires, characteristic changes of the rpm trace of the engine occur with respect to the normal operation without misfires. Normal operation without misfires and operation with misfires can be distinguished from a comparison of these rpm traces.

A method operating on this basis is disclosed in German patent publication 4,138,765 which corresponds to U.S. patent application Ser. No. 07/818,884, filed Jan. 10, 1992, now abandoned.

According to this known method, each cylinder is assigned a crankshaft angular region which is characterized as a segment. The segments are realized, for example, by markings on a transducer wheel coupled to the crankshaft. The segment time is that time in which the crankshaft passes through this angular region. The segment time is dependent, inter alia, on the energy converted in the combustion stroke. Misfires lead to an increase of the segment times detected in synchronism with ignition. According to the known method, a measure for the rough running of the engine is computed from the differences of the segment times. Additionally, slow dynamic operations can be computer compensated. Such dynamic operations are, for example, the increase of the engine rpm during acceleration of the vehicle. A rough-running value, which is computed for each ignition, is likewise compared to a predetermined threshold value in synchronism with ignition. Exceeding this threshold value is evaluated as a misfire. The threshold value is dependent, as required, from operating parameters such as load and rpm.

The reliability with which the misfires are detected in accordance with this method drops perforce by an amount the fewer individual misfires operate upon the rpm of the crankshaft. The reliability of misfire detection therefore drops with an increase in the number of cylinders of the engine and with an increase of rpm as well as with reducing load.

SUMMARY OF THE INVENTION

In view of the above, it is an object of the invention to provide a method which improves the reliability of the detection of misfires in internal combustion engines having a high number of cylinders as well as for high engine speeds and low loads.

The method of the invention is for detecting combustion misfires in an internal combustion engine having a crankshaft and a transducer wheel coupled to the crankshaft and a sensor. The combustion misfires are detected on the basis of a time-dependent trace of the rotational movement of the transducer wheel and the transducer wheel has predetermined segments which pass the sensor. The method includes the steps of: utilizing the sensor to detect segment times in which the segments pass the sensor so that the sensor produces a sensor signal representing the segment times; applying the sensor signal as an input signal to first and second lowpass filters mutually connected in parallel thereby obtaining first and second output signals which react with different speeds to changes in the input signal; forming the difference between the first and second output signals; forming a measure for the changes of the difference; comparing the measure to a threshold value; and, evaluating a movement of the measure above the threshold value as a misfire.

The evaluation of the difference of segment-time signals is based on the physical background presented below. The segment-time signals are filtered with lowpasses of different speed. The evaluation provided by the invention has the advantages presented below.

In a combustion misfire, energy is not released as expected in the engine. One or several extended segment times occur because of the acceleration of the crankshaft which does not take place as a consequence of the misfire. This occurrence takes place within a very short time. The two lowpass filters can follow only with different delays. A time-dependent temporary change of the filter difference results for the formation of the difference of the two filter output signals in combination with a combustion misfire. Stated otherwise, the trace of the filter difference shows specific characteristics when misfires occur. The evaluation of these characteristics according to the invention leads to an improved reliability of detection.

It is advantageous that the formation of the filter difference signal in accordance with the invention eliminates the direct-current component of the segment-time signal which is of no interest with respect to the detection of the misfire. In contrast, the segment-time fluctuations with frequencies between the crankshaft frequency and the camshaft frequency remain for the difference formation.

The filter difference signal formation in accordance with the invention leads especially to a clear signal when the segment time collapses, which are caused by combustion misfires, take place in this frequency range and therefore are effective over several segments as is the case especially for high rpm. The method of the invention is especially suitable for the detection of misfires in the region of high rpm which is critical with respect to detection reliability.

Advantageously, a measure for the changes on the basis of the trace of the filter difference between two sequential zero crossovers of the filter difference in the same direction is determined.

The above-mentioned measure for the changes can be determined without great complexity in that sequential values of the filter difference are summed with respect to magnitude. The filter difference values can be weighted.

A weighting of the filter difference curve with the amplitude of the filter difference is especially advantageous, that is, with the spacing of the value of the minimum from the value of the next-following maximum and vice versa.

In lieu of an evaluation of the filter difference between two zero locations, a predetermined region about a single zero position can be applied for evaluation. A zero crossover from the negative to the positive can advantageously be used. The advantage of this variation results from the essentially steeper zero passthrough of the filter difference curve from minus to plus in comparison to the reverse direction. A reduced influencing via dynamic motor operation and stochastic disturbances accompany this effect.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
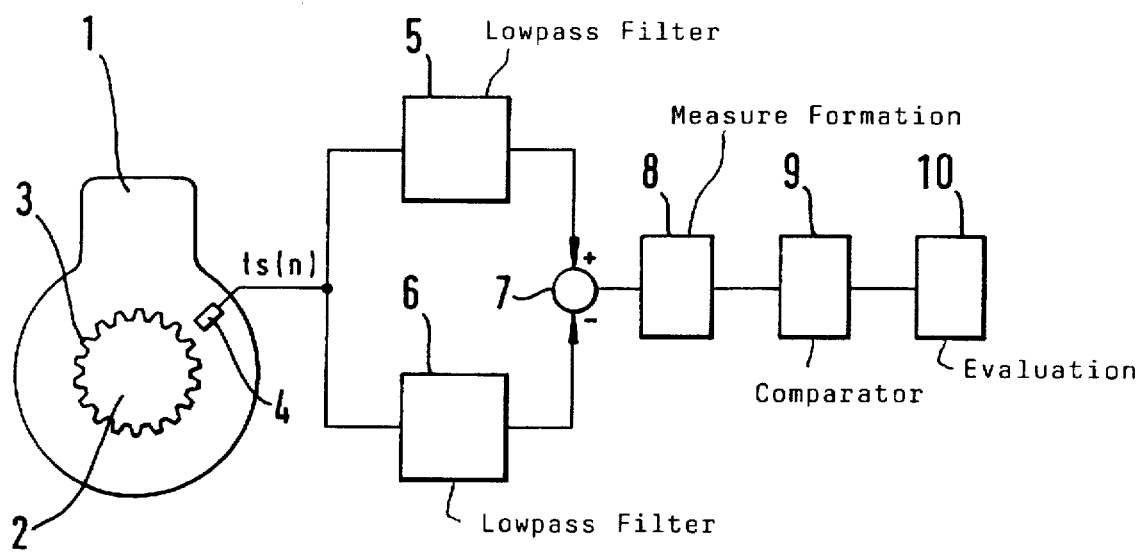
FIG. 1 is a block diagram showing an embodiment of the method of the invention.

FIG. 1 shows an internal combustion engine 1 having an angular transducer wheel 2 carrying markings 3, an angle sensor 4, blocks 5 and 6 representing respective lowpass filters, a logic connection 7 for forming the filter difference, that is, for forming the difference of the output signals of the lowpass filters. FIG. 1 further shows a block 8 which symbolizes the formation of a measure for the change of the filter difference, a block 9 for the comparison of the output signal of block 8 to a threshold value and means 10 which evaluates as a misfire when the threshold value in block 9 is exceeded, that is, displays, counts and/or stores.

The function blocks are preferably realized via programming a computer wherein a computer unit arbitrates between an input block and an output block while using programs and data stored in a memory.

The rotational movement of the angle transducer wheel, which is coupled to the crankshaft of the engine, is converted with the aid of the angle sensor 4 into an electrical signal. The angle sensor is realized as an inductive sensor and the periodicity of the signal is an image of the periodic passing of the periodicity of the markings 3 at the angle sensor 4. The time duration between the increase and the drop of the signal level therefore corresponds to the time in which the crankshaft has rotated further over an angular region corresponding to the extent of a marking.

The angle transducer wheel is subdivided into segments. Each segment exhibits a predetermined number of markings and includes the upper dead center point lying in the combustion stroke of each cylinder. A rotational angle range $\phi k$ is defined about this point. This angular region extends, for example, for a four cylinder engine, over half the markings of the angle transducer wheel. The angular regions corresponding to a crankshaft revolution can be separated from each other or be mutually contiguous or even overlap. In the first case, markings are provided which correspond to no angular region. In the second case, each marking corresponds precisely to one angular region and, in the third case, the same markings can correspond to different angular regions. Accordingly, angular regions having any length and position are possible.

The segment times, which are detected with respect to the respective angular regions, are lowpass filtered in parallel in the blocks 5 and 6. In this embodiment, the lowpass filter 6 is the faster filter. In block 7, the signal of the more rapid lowpass filter is subtracted from the signal of the slower lowpass filter.

The segment time extension in the case of a misfire and also the shortening which follows is seen first in the signal of the more rapid filter and, delayed, in the signal of the slower filter. In this way, a negative trace of the filter difference results which is followed directly by a positive trace.

A measure for the change of the filter difference is determined in block 8. For this purpose, a determination of the zero locations can be used supplemented by a summing of the magnitudes of the filter difference between two sequential zero crossovers in the same direction. The value of the sum is then a measure for the change of the difference of the filter outputs. When this measure exceeds a specific threshold value in block 9, then this is evaluated in block 10 as a misfire; that is, it is counted as such and/or stored and/or displayed.

Figure 2A:
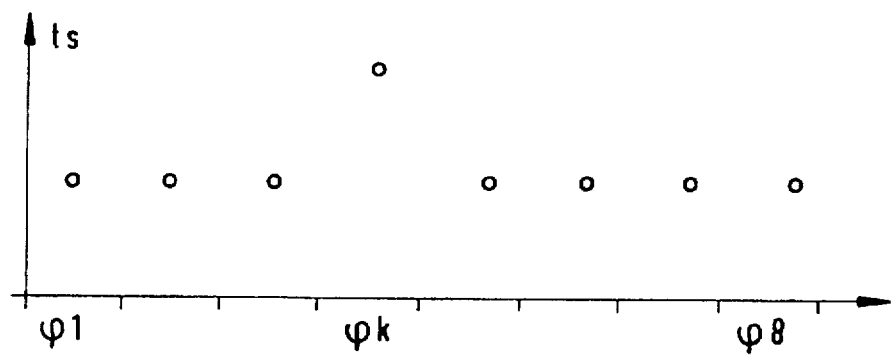
FIG. 2a shows the course of the segment times.

In FIG. 2a, the times ts are plotted in which the angle regions are passed through by the rotational movement of the crankshaft. A misfire in cylinder k is then assumed. The absence of torque associated with the misfire leads to an increase of the corresponding time span ts.

Figure 2B:
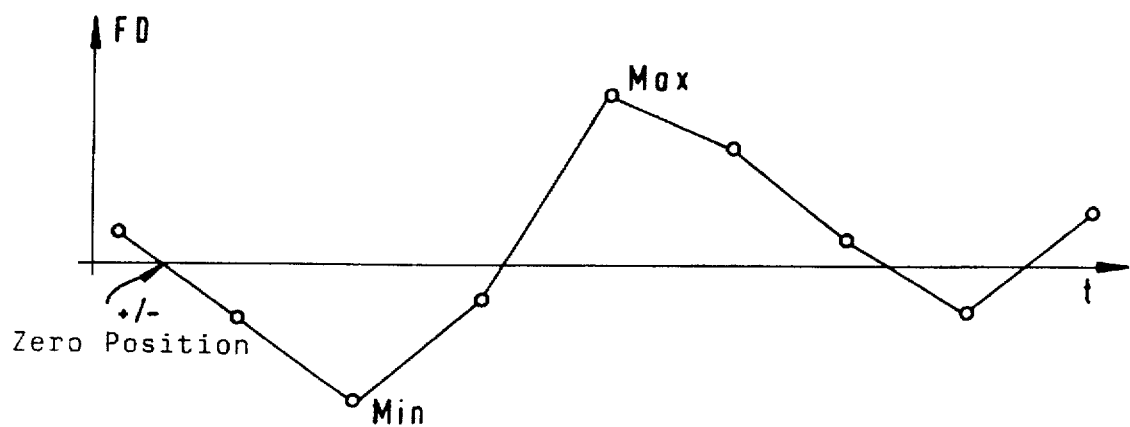
FIG. 2b shows the trace of the filter difference formed in accordance with the invention.

FIG. 2b shows the trace of the filter difference formed in accordance with the invention when a misfire occurs.

In the embodiment shown, a check is made as to the filter difference zero crossover from plus to minus. If such a crossover is present, then a measure for the changes of the filter difference is determined on the basis of its trace between two zero crossovers taking place in the same direction. For this purpose, for example, after a first zero crossover from plus to minus, the values of the filter difference are summed with respect to magnitude at the clock rate of the sequence of the segment times until such a zero crossover again occurs. Then, the sum value is set to zero and the summation begins anew. The summation is terminated after a highest duration to be applied.

As shown in FIG. 2b, the sum of the added magnitudes becomes greater with the increase of the signal amplitude swings. Small summation values, as they occur about the zero line because of stochastic fluctuations of the filter difference, will therefore not exceed a threshold value to be applied. In contrast, combustion misfires lead to large summation values and can therefore be detected from the threshold value being exceeded.

The filter difference values can be provided with weighting factors before or after the summation. As such, especially differences of maxima and minima of the filter difference curve are suited in the evaluated region between the zero positions considered.

In another embodiment of the invention, a check is made as to the filter-difference zero crossover from minus to plus. If such a crossover is present, then a characteristic quantity is computed from the sum of the filter difference values from a pregiven region about the zero position and is used as a measure for the changes of the difference. The sum can still be weighted multiplicatively with the difference of the filter difference maximum and filter difference minimum in this region. The region can, for example, lie centered about the zero position and have the length of a camshaft revolution. The advantage of this embodiment is essentially the steeper zero crossover of the filter-difference curve from minus to plus (in contrast to the reverse direction from plus to minus) and, accordingly, reduced influence via dynamic engine operation and stochastic disturbances.

The described methods define nonlinear logic operations of quantities derived from the filter-difference curve. They consider the signal amplitude swings, their maxima and minima within a narrow region as well as the behavior of the filter difference curve in the frequency region in the form of the location of the zero positions. Stated otherwise, the logic operations are based on the search for a specific characteristic curve form in the previously determined signal trace. This characteristic curve form is characterized by a curve minimum less than zero and a subsequent maximum greater than zero which must occur within one camshaft revolution.

In addition, it is noted that, for the filtering, the correct phase position of the filters to each other and with respect to the considered segment time having index (n) must be observed. The rapid filter can, for example, can be realized by a mean value formation of segment times of a half camshaft revolution and the slow filter can be realized by the averaging over a larger region, for example, an entire rotation of the camshaft which includes the half camshaft revolution.

The filter difference values formed in this way can be provided with weighting factors alternatively before or after the summation.

As weighting factors, the values of the difference for the local minimum and for the local maximum in the region of the zero crossover appears especially suitable. These can be determined and the difference quantity between these values can be used as a weighting factor.

In the method of the invention, the values of the difference or the values of the weighting factors or the values of the difference and of the weighting factors can be squared.

It is understood that the foregoing description is that of the preferred embodiments of the invention and that various changes and modifications may be made thereto without departing from the spirit and scope of the invention as defined in the appended claims.

What is claimed is:

1. A method for detecting combustion misfires in an internal combustion engine having a crankshaft and a transducer wheel coupled to said crankshaft and a sensor, the combustion misfires being detected on the basis of a time-dependent trace of the rotational movement of said transducer wheel and the transducer wheel having predetermined segments which pass said sensor, the method comprising the steps of:

utilizing said sensor to detect segment times in which said segments pass said sensor so that said sensor produces a sensor signal representing said segment times;

applying said sensor signal as an input signal to first and second lowpass filters mutually connected in parallel thereby obtaining first and second output signals which react with different speeds to changes in said input signal;

forming the difference between said first and second output signals with said difference changing as a function of time;

forming a measure for the changes of said difference;

comparing said measure to a threshold value; and, evaluating a movement of said measure above said threshold value as a misfire.

2. The method of claim 1, wherein said difference defines a zero crossover when said difference goes from negative to positive or vice versa; and, said method comprises the further steps of:

determining the zero crossovers of the difference which take place in a pregiven direction; and, forming said measure on the basis of a trace of said difference between two sequential ones of said zero crossovers.

3. The method of claim 2, comprising the further steps of:

forming said difference in step with a sequence of said segment times;

summing successive values of the difference which follow sequentially between said zero crossovers; and, using the sum of said values as said measure for said changes of said difference.

4. The method of claim 3, wherein the successive values before or after said summing are provided with weighting factors.

5. The method of claim 4, comprising the further steps of:

determining the values of said difference at the local minimum and at the local maximum between said zero crossovers;

determining the difference amount between said values; and, utilizing the difference amount as a weighting factor.

6. The method of claim 5, at least one of the following is squared: the values of said difference; the values of the weighting factors; and, the values of the difference and the weighting factors.

7. The method of claim 2, wherein said first lowpass filter is a fast lowpass filter and said second filter is a lowpass filter slower than said first lowpass filter; said zero crossovers have a pregiven transition from positive to negative values when the value of said first lowpass filter is subtracted from the value of said second lowpass filter when forming said difference; and, said zero crossovers have a pregiven transition from negative to positive values when the value of said second lowpass filter is subtracted from the value of said first lowpass filter.

8. The method of claim 1, comprising the further steps of:

determining a zero crossover of said difference which takes place in a pregiven direction;

summing the values of said difference from a predetermined region about the zero location; and, using the sum as a measure for the changes of said difference.

9. The method of claim 8, comprising the further steps of:

summing the values of the difference from a predetermined region about the zero location;

determining the values of said difference from said predetermined region at the local minimum and at the local maximum;

determining the difference amount between said values; and, weighting the summed values with said difference amount.

10. The method of claim 9, wherein said predetermined region approximately includes the differences, which are formed during a revolution of the camshaft; and, said predetermined region symmetrically including the zero location.

* * * * *